United States Patent [19]

Karasudani et al.

[11] 4,020,217

[45] Apr. 26, 1977

[54] LAMINATED GLASS STRUCTURES AND PROCESS FOR PRODUCTION THEREOF

[75] Inventors: Isao Karasudani, Kyoto; Toshiyuki Takashima; Yoshiyuki Bokuda, both of Shiga, all of Japan

[73] Assignee: Sekisui Kagaku Kogyo Kabushiki Kaisha, Osaka, Japan

[22] Filed: Mar. 7, 1975

[21] Appl. No.: 556,414

[30] Foreign Application Priority Data

Mar. 9, 1974   Japan ............................... 49-27406
Mar. 9, 1974   Japan ............................... 49-27407

[52] U.S. Cl. .................. 428/429; 156/106; 156/309; 156/329; 260/29.15 B; 260/23 AC; 428/432; 428/437; 428/524; 428/539; 428/447; 428/451; 428/911

[51] Int. Cl.$^2$ .................. B32B 27/42; C08L 91/00

[58] Field of Search .......... 428/429, 451, 437, 911, 428/428, 447, 432, 524, 539; 260/29.15 B, 23 AC, 827; 156/106, 309, 329

[56] References Cited

UNITED STATES PATENTS

| | | | |
|---|---|---|---|
| 2,404,426 | 7/1946 | Bechtold | 428/451 |
| 2,692,844 | 10/1954 | Hyde | 428/429 |
| 3,262,835 | 7/1966 | Lavin | 428/437 |
| 3,262,837 | 7/1966 | Lavin | 428/437 |
| 3,317,369 | 5/1967 | Clark | 428/429 |
| 3,341,399 | 9/1967 | Hazdra | 428/429 |

FOREIGN PATENTS OR APPLICATIONS

| | | | |
|---|---|---|---|
| 735,399 | 5/1966 | Canada | 428/429 |
| 1,215,318 | 12/1970 | United Kingdom | 428/437 |
| 1,264,440 | 2/1972 | United Kingdom | 428/409 |

*Primary Examiner*—Ellis P. Robinson
*Attorney, Agent, or Firm*—Wenderoth, Lind & Ponack

[57] ABSTRACT

A laminated safety glass structure which comprises at least two glass sheets bonded to each other through an interlayer of a plasticized polyvinyl acetal resin treated with a specific modified siloxane alone or together with a specific alkali metal or alkaline earth metal salt of an organic mono- or di-carboxylic acid. This structure has a highly improved penetration resistance along with superior transparency, aging resistance and weatherability, and is suitable for use as windowpanes in transportation facilities and buildings.

25 Claims, No Drawings

LAMINATED GLASS STRUCTURES AND PROCESS FOR PRODUCTION THEREOF

This invention relates to a laminated safety glass structure, and more specifically to a laminated glass structure having improved resistance to penetration, a process for producing the laminated glass structure, and to an interlayer for use in the laminated glass structure.

Laminated safety glass structures have been widely used as windowpanes in various transportation facilities and buildings. Usually these safety glass structures comprise two glass sheets and an interlayer of a plasticized polyvinyl acetal resin interposed between them. When such laminated safety glass structures undergo impact, although the glass sheets may break, the interlayer does not break but absorbs the shock. Accordingly, the colliding object does not easily penetrate into the glass structure, and since the broken glass sheets remain adhered to the interlayer even after the breakage, the glass fragments do not scatter about. This offers the advantage that no serious injury is caused to passengers of transportation facilities or occupants of buildings.

However, the various transportation facilities have recently been driven at higher speeds, and there has been a social need to increase the penetration resistance of laminate safety glass structures by improving the interlayer, and thus to protect humans more from external shocks.

One method attempted in the past with a view to increasing the penetration resistance of laminate safety glass structures is directed to increasing the thickness of the interlayer. However, because of the restriction on the thickness of the laminated safety glass, the thickness of the interlayer that can be chosen is naturally limited. It has also been attempted to provide a laminated safety glass with increased penetration resistance by adjusting the moisture content of the interlayer and thus maintaining the adhesion between the interlayer and the glass with an optimum bond strength. This method may result in some improvement of the penetration resistance, but because the interlayer contains a relatively large amount of moisture, the laminate glass has the defect that air bubbles are formed in it or the aging resistance of the interlayer is reduced, thereby impairing the commercial values of the product as a safety glass.

Another example of the laminated safety glass is disclosed, for example, in Japanese Patent Publications Nos. 32071/70 and 4270/71 in which attempts are made to include an additive for increasing impact strength, such as an alkali metal or alkaline earth metal carboxylate, or a layer of the additive is provided in the interface between the glass sheets and the interlayer. In order to obtain sufficiently high penetration resistance, the amount of such additive must be increased, but the use of such additives in large amounts tends to cause clouding of the resulting laminated safety glass. Furthermore, in the production of laminated safety glass structures using such additives for increasing impact strength, the moisture content of the interlayer must be strictly adjusted to a limited range of 0.4 to 0.6% by weight prior to the laminating operation. If the moisture content adjustment is not done well, it is impossible to obtain laminated glass structures having sufficiently increased penetration resistance, and in an extreme case, peeling occurs between the interlayer and the glass sheets.

It is a primary object of this invention to provide a laminated glass structure having improved penetration resistance without impairing its other characteristics such as transparency, aging resistance or weatherability.

A secondary object of this invention is to provide an interlayer for a laminated glass structure, which, without particularly adjusting its moisture content, can give a laminated glass structure of high penetration resistance while maintaining its other characteristics such as transparency, weatherability or aging resistance at a high level.

Another object of this invention is to provide a process for producing a laminated glass structure having improved penetration resistance while maintaining its other desirable properties such as high transparency, aging resistance or weatherability.

Other objects and advantages of this invention will become clear from the following description.

According to this invention, there is first provided a laminated glass structure comprising at least two glass layers bonded to each other through an interlayer of a plasticized polyvinyl acetal resin, said polyvinyl acetal resin being treated with a member selected from the group consisting of a. modified siloxanes containing 1 to 30 recurring units of each of the following formulae

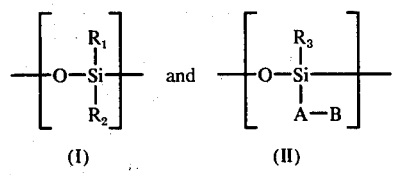

wherein $R_1$, $R_2$ and $R_3$, independently from each other, represent a monovalent hydrocarbon group; A represents an alkylene group containing not more than 20 carbon atoms which is optionally substituted with a hydroxyl group, or an oxyalkylene group containing not more than 250 carbon atoms which is optionally substituted with a hydroxyl group; and B represents

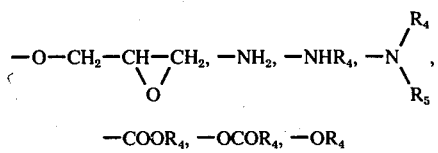

in which $R_4$ and $R_5$, independently from each other, represent an alkyl group, with the proviso that when B is -OH, A represents an oxyalkylene group, and b. combinations of said modified siloxanes with alkali metal or alkaline earth metal salts of organic mono- or di-carboxylic acids.

The laminated glass structure provided by this invention is characterized by the fact that the interlayer of plasticized polyvinyl acetal resin has improved high penetration resistance in addition to its inherent superior transparencey, aging resistance and weatherability.

The present invention further provides an interlayer for a laminated glass structure, comprising a plasticized polyvinyl acetal resin containing, or having adhered thereto, a modified siloxane containing 1 to 30 recurring units of each of formula (I) and formula (II), and an alkali metal or alkaline earth metal salt of an organic mono- or di-carboxylic acid.

The interlayer of this invention has the advantage that without strictly adjusting its moisture content to a narrow range in the production of a laminated glass structure, it can give a laminated glass structure having high penetration resistance over a wide range of moisture contents and superior properties such as transparency, aging resistance and wheatherability.

The plasticized polyvinyl acetal resin that is used to prepare the interlayer of this invention may be any known species. Especially, plasticized polyvinyl butyral resins are suitable. Plasticizers used to prepare such polyvinyl acetal resins are also known, and for example, triethylene glycol 2-ethyl butyrate, triethylene glycol di-2-ethyl hexoate, and dibutyl sebacate are suitable.

The degree of acetalization of the polyvinyl acetal resin is preferably 55 to 80 mol%, because sufficient bond strength cannot be obtained if it is either too low or too high.

The term "degree of acetalization", used herein, denotes the proportion in mol% of the acetalized recurring units of the polyvinyl acetal resin based on the total of the recurring units in the polyvinyl acohol molecule before acetalization.

Advantageously, the amount of the plasticizer is 20 to 60 parts by weight per 100 parts by weight of the polyvinyl acetal resin.

The plasticized polyvinyl acetal resin can be fabricated into an interlayer suitable for glass lamination by any known method, such as by extruding it into a sheet using an extruder, or by forming it into a sheet using a heated roll.

According to this invention, the plasticized polyvinyl acetal resin is treated with a specific modified siloxane alone, or a combination of it with an alkali metal or alkaline earth metal salt of an organic mono- or di-carboxylic acid.

Useful modified siloxanes are those containing 1 to 30 recurring units of each of formulae (I) and (II). In formulae (I) and (II), examples of suitable monovalent hydrocarbon groups represented by $R_1$, $R_2$ and $R_3$ include alkyl groups such as methyl, ethyl, n- or iso-propyl, and n-, sec- or tert.-butyl groups, aryl groups such as phenyl, tolyl, xylyl and naphthyl groups, aralkyl groups such as benzyl and phenethyl groups, and cycloalkyl groups such as cyclopentyl, cyclohexyl and cycloheptyl groups. Of these, alkyl groups containing 1 to 5 carbon atoms and phenyl are especially preferred.

A is an alkylene group containing not more than 20 carbon atoms, preferably 2 to 5 carbon atoms, for example, ethylene, n- or iso-propylene, and n- or iso-butylene groups, or an oxyalkylene group containing not more than 250 carbon atoms, preferably 6 to 100 carbon atoms, preferably, an oxyalkylene group of the following formula $$-(R_6)_p O-C_2H_{2q}-_r \quad (III)$$

wherein $R_6$ is an alkylene group containing not more than 20 carbon atoms, especially 1 to 5 carbon atoms; $p$ is 0 or 1; $q$ is an integer of 2 to 5; and $r$ is an integer of 1 to 50, with the proviso that when $r$ is 2 or more, $p$ and $q$ in one unit may be different, respectively from $p$ and $q$ in another unit. Examples of such oxyalkylene groups are

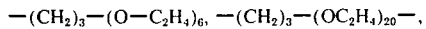
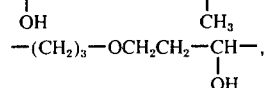

and

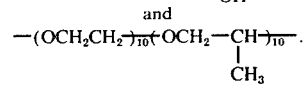

$R_4$ and $R_5$ are preferably alkyl groups containing 1 to 5 carbon atoms such as methyl, ethyl, n- or iso-propyl, and n-, sec- and tert.-butyl groups.

A suitable group of modified siloxanes that can be used in this invention include those containing 1 to 30, preferably 2 to 20, recurring units of each of the following formulae

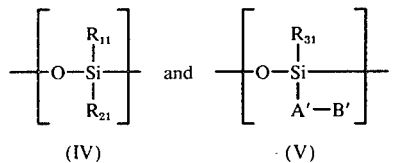

wherein $R_{11}$, $R_{21}$ and $R_{31}$, independently from each other, represent an alkyl group containing 1 to 5 carbon atoms, or an phenyl group; A' represents an alkylene group containing 2 to 5 carbon atoms which is optionally substituted by a hydroxyl group, or an oxyalkylene group containing 6 to 100 carbon atoms which is optionally substituted by a hydroxyl group; and B' represents

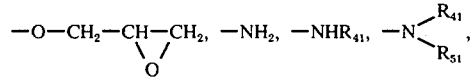

$-COOR_{41}$, $-OCOR_{41}$, $-OR_{41}$, or $-OH$, in which $R_{41}$ and $R_{51}$, independently from each other, represent an alkyl group with 1 to 5 carbon atoms, with the proviso that when B' is -OH, A' represents an oxyalkylene group.

The recurring units of formulae (I) and (II), or those of formulae (IV) and (V) can be distributed irregularly in the modified siloxane. They can also be present in the blocked form. The modified siloxanes in accordance with this invention consist substantially of these two kinds of recurring units, but may contain a small amount of another type of recurring unit so long as it does not markedly change the basic properties of the siloxane.

The modified siloxane is a generally light yellow transparent liquid containing at least one of the recurring units of each of formulae (I) and (II), or the recurring units of each of formulae (IV) and (V). It is preferred that the total number of the recurring units of the formulae (I) and (II) and those of the formulae (IV) and (V) is 4 to 40. Usually, the terminal groups are trialkylsilyl groups, but may be other groups, for example, hydroxyalkylsilyl groups of silicon free groups.

Typical examples of the modified siloxanes that can be suitably used in this invention are shown below.

1. An epoxy-modified siloxane having 15 recurring units of each of the following formulae

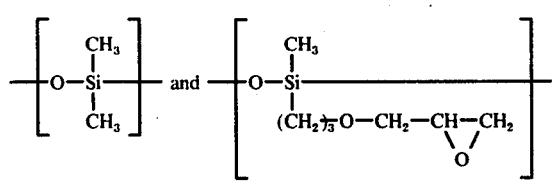

and containing a trimethylsilyl group at both ends.

2. An ether-modified siloxane having 15 each of recurring units of each of the following formulae

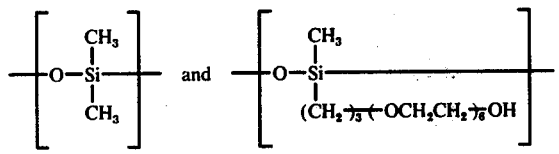

and containing a trimethylsilyl group at both ends.

3. An ester-modified siloxane having 15 recurring units of each of the following formulae

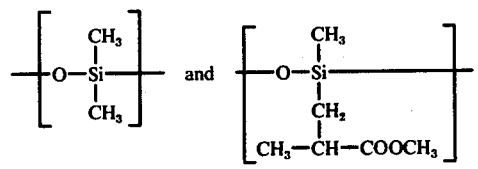

and containing a trimethylsilyl group at both ends.

4. An ether-modified siloxane having 15 recurring units of the formula

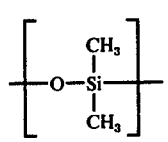

and 6 recurring units of the following formula

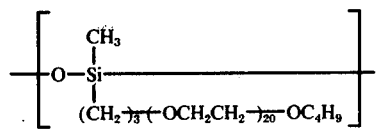

and containing a trimethylsilyl group at both ends.

5. A modified siloxane of the following formula

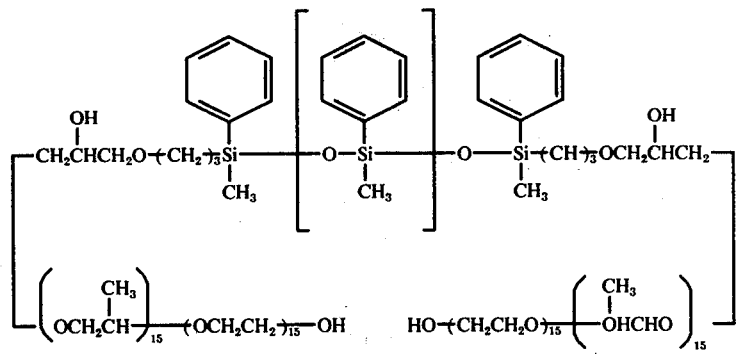

6. An ether-modified siloxane having 15 recurring units of the formula

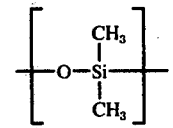

and 6 recurring units of the formula

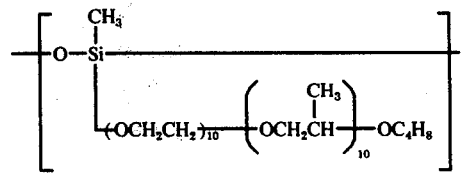

and containing a triethylsilyl group at both ends.

7. An amino-modified siloxane having 15 recurring units of each of the following formulae

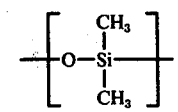

and

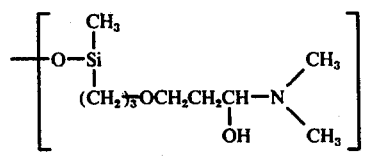

and containing a trimethylsilyl group at both ends.

8. An acyloxy-modified siloxane having 15 recurring units of each of the following formulae

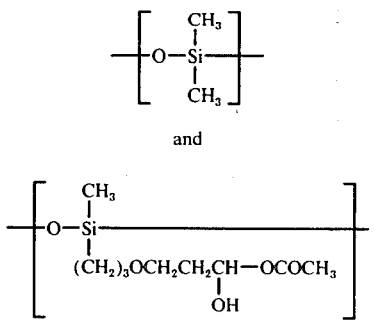

and and containing a trimethylsilyl group at both ends.

Most of the above modified siloxanes are known, and those which are novel can be produced in the same manner as in the preparation of the known modified siloxanes.

There is no strict limit to the amount of the modified siloxane to be applied to the plasticized polyvinyl acetal resin. Generally, the amount is 0.005 to 0.5 part by weight, preferably 0.01 to 0.1 part by weight, per 100 parts by weight of the polyvinyl acetal resin in the plasticized resin.

According to the present invention, a laminated glass structure having sufficiently improved penetration strength can be obtained by using an interlayer comprising the plasticized polylvinyl acetal resin treated only with the modified siloxane. It is advantageous however to use an interlayer composed of the plasticized polyvinyl acetal resin treated with a combination of the modified siloxane and an alkali metal or alkaline earth metal salt of an organic mono- or di-carboxylic acid.

The organic mono-or di-carboxylic acids used for preparing the salts are suitably aliphatic monocarboxylic acids containing not more than 22 carbon atoms, preferably up to 12 carbon atoms, an aliphatic dicarboxylic acids containing 4 to 9 carbon atoms. The aliphatic monocarboxylic acids are not only linear aliphatic monocarboxylic acids, but also cyclic aliphatic (alicyclic) monocarboxylic acids, and include, for example, formic acid, acetic acid, propionic acid, butyric acid, valeric aid, octanoic acid, and 2-methyl-norbornane-2-carboxylic acid. Examples of the aliphatic dicarboxylic acid are oxalic acid, succinic acid, glutaric acid, adipic acid, and hexamethylenedicarboxylic acid.

Examples of the alkali metal that can be used to form salts with these organic carboxylic acids are sodium, potassium, and lithium, the potasium being especially suitable. Examples of the alkaline earth metals are magnesium, calcium and barium, the magnesium and calcium being especially preferred.

Examples of suitable alkali metal or alkaline earth metal salts of organic mono- or dicarboxylic acids are calcium acetate, magnesium acetate, potassium propionate, magnesium octanoate, magnesium 2-methylnorborane-2-carboxylate, and magnesium adipate. These carboxylic acid salts are used either alone or in a combination of two or more.

There is no strict limit to the amount of the alkali metal or alkaline earth metal salt of the mono- or dicarboylic acid, but it is usually applied in an amount of 0.005 to 0.5 part by weight, preferably 0.01 to 0.2 part by weight, per 100 parts by weight of the polyvinyl acetal resin in the plasticized resin.

In order to treat the interlayer of the plasticized polyvinyl acetal resin with the modified siloxane or a combination of the modified siloxane with the carboxylic acid salt, it is suitable to incorporate or adhere such a treating agent in or to the interlayer. The requirement here is that the modified siloxane or a combination of it with the carboxylic acid salt be present in the interface between the glass sheets and the polyvinyl acetal interlayer when the glass sheet are bonded through the interlayer. Accordingly, a method can be employed which comprises adhering the modified siloxane or a combination of it with the carboxylic acid salt to the surfaces of the glass sheets the be bonded to each other, and then laminating these glass sheets through a non-treated plasticized polyvinyl acetal resin film.

According to one embodiment, the modified siloxane or both the modified siloxane and the carboxylic acid salt are added to a mixture of the polyvinyl acetal resin and a plasticizer for it, and then the resulting mixture is fabricated into film form. In another embodiment, the modified siloxane or both the modified siloxane and the carboxylic acid salt are coated on an interlayer film fabricated from the plasticized polyvinyl acetal resin. An especially preferred embodiment involves forming an interlayer film from a mixture of the polyvinyl acetal resin and a plasticizer mixture consisting of a plasticizer and the modified siloxane or both the modified siloxne and the carboxylic acid salt by the method described hereinbefore.

Laminated safety glass structures of this invention can be produced by any known methods for glass sheets and the polyvinyl acetal resin interlayer containing the modified siloxane or both the modified siloxane and the carboxylic acid salt, or having such a treating agent adhered thereto. Examples of such known methods are disclosed in U.S. Pat. Nos. 3,551,281, 3,262,835, and 3,838,091.

For example, a laminated safety glass can be obtained by interposing the interlayer between two glass sheets and maintaining the assembly at 80° to 160° C. and 5 to 10 kg/cm² for 10 to 60 minutes.

Thus, according to this invention, a laminated glass structure is provided which has high penetration resistance while retaining other good properties such as superior transparency, aging resistance and weatherability.

The interlayer made of the plasticized polyvinyl acetal resin treated with a combination of the above modified siloxane and the alkali metal or alkaline earth metal salt of mono- or dicarboxylic acid has the advantage that it gives a laminated glass structure having high transparency and sufficiently improved penetration resistance even if it is thin, and that without particularly adjusting the moisture content of the interlayer during the laminating operation, a laminated glass structure having superior aging resistance and weatherability and high penetration resistance can be provided.

The laminated glass structure of this invention can be used widely as windowpanes in transportation facilities such as automobiles, air planes and ships, and buildings.

The following Examples further illustrate the present invention. In these Examples, the following modified siloxanes were used.

Modified Siloxane A:
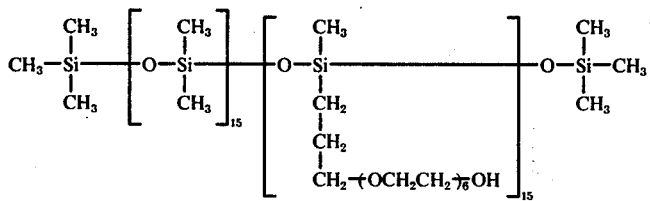
Modified Siloxane B:
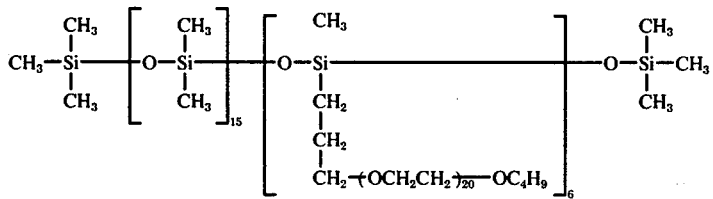
Modified Siloxane C:
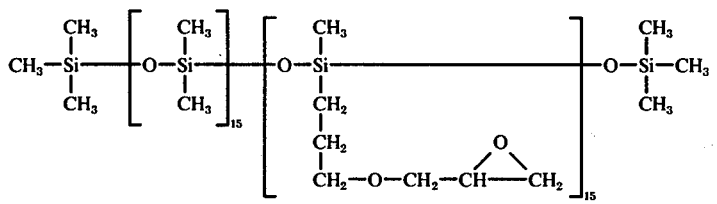
Modified Siloxane D:
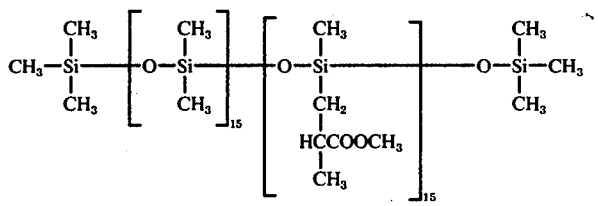
Modified Siloxane E:
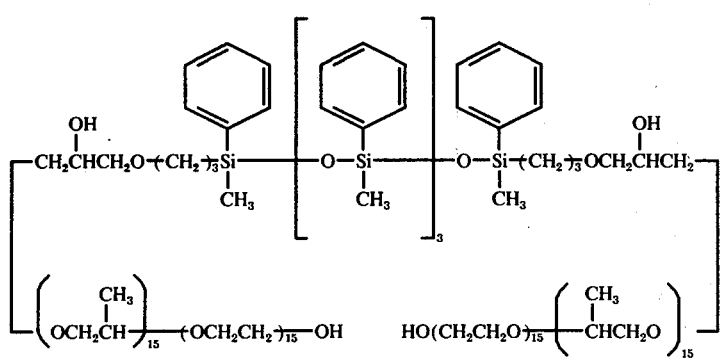
Modified Siloxane F:
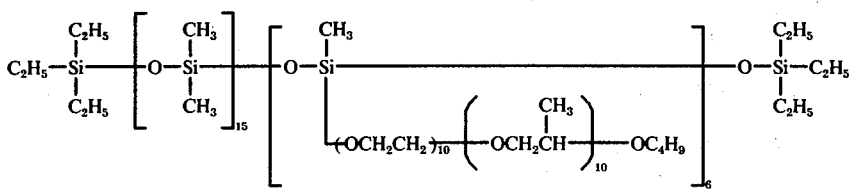
Modified Siloxane G:

-continued

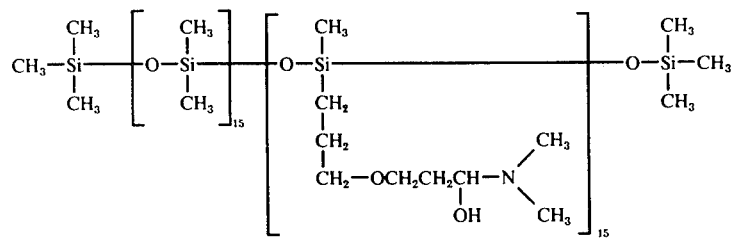

Modified Siloxane H:

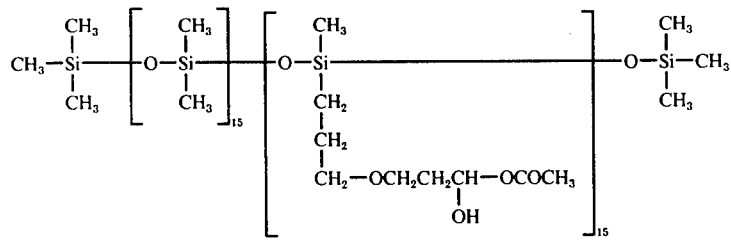

The penetration strength of the laminated glass structures obtained was measured by the following method.

Method for testing penetration resistance

Laminated safety glass structures with a size of 30 cm × 30 cm were held horizontal by supporting their edges, and a steel ball weighting 2.26 kg was let fall naturally from above onto the center of the safety glass at a temperature of 20° C. The ball was dropped ten times from the same height, and the height of falling was increased gradually. The height of the ball from the glass surface which resulting in nonpenetration of the steel ball into 50% of the glass tested was determined (ball falling height). The larger this height is, the higher is the penetration resistance.

EXAMPLE 1

Two polyvinyl butyral resins each weighting 100 parts by weight and having a degree of polymerization of 1700, a degree of butyralization of 65 mol%, a residual vinyl alcohol content of 24.5 mol%, and a residual vinyl acetate content of 0.5 mol% were prepared. Modified Siloxane C in an amount of 0.05 part by weight and 0.08 part by eight respectively was mixed with 40 parts by weight of triethylene glycol di-2ethylbutyrate. Each polyvinyl butyral resin was mixed with the plasticizer mixture, and the resulting mixture was kneaded at 70° C. by means of a roll, and formed into a film having a thickness of 0.7 mm at 140° C. and 30 kg/cm².

A number of glass sheets having a thickness of 3 mm and a size of 30 cm × 30 cm were prepared, and the two kinds of the interlayer obtained were respectively disposed between two of the glass sheets, and the glass sheets were laminated at 120° C. and 10 kg/cm². At this time, the amount of the interlayer was adjusted to 0.4% beforehand by allowing the interlayer to stand in a constant temperature-humidity chamber.

For comparison, a laminated safety glass was prepared in the same way as above except that the modified siloxane was not used.

The penetration resistance of the three safety glass specimens was measured, and the results are shown in Table 1.

Table 1

| Amount of the modified siloxane C (part by weight) | Ball falling height (feet) |
| --- | --- |
| 0.05 | 18 |
| 0.08 | 20 |
| — | 9 |

EXAMPLE 2

The procedure of Example 1 was repeated was repeated except that modified siloxanes A, B, D, E, F, G and H were ued respectively in the amounts indicated in Table 2. The results are shown in Table 2.

Table 2

| | Amounts of modified siloxanes (parts by weight) | Ball falling height (feet) |
| --- | --- | --- |
| A | 0.03 | 20 |
|   | 0.05 | 23 |
| B | 0.03 | 20 |
|   | 0.05 | 23 |
| D | 0.05 | 17 |
|   | 0.08 | 20 |
| E | 0.05 | 20 |
| F | 0.05 | 20 |
|   | 0.05 | 16 |
| F | | |
|   | 0.08 | 18 |
| H | 0.03 | 15 |
|   | 0.05 | 18 |
| Blank (no siloxane used) | | 9 |

EXAMPLE 3 100 Parts by weight of a polyvinyl butyral resin having a degree of polymerization of 1700, a degree of butyrallization of 65 mol%, a residual vinyl alcohol content of 24.5 mol%, and a residual vinyl acetate content of 0.5 mol%, was prepared. Separately, 40 parts by weight triethylene triethylerne glycol di-2-ethyl butyrate was mixed with 0.03 part by weight of modified siloxane B and 0.1 part by weight of a 40% by weight butyl cellosolve solution of magnesium octanoate to form a plasticizer mixture.

The polyvinyl butyral resin was mixed with the above plasticizer mixture, and kneaded at 70° C. by means of a roll. The kneaded mixture was formed into a 0.7 mm thick film of a plasticized polyvinyl butyral resin at a temperature of 140° C. and a pressure of 30 kg/cm². The interlayer film was cut to suitable sizes, and allowed to stand in a constant temperature humidity chamber to form interlayer films of various moisture contents as shown in Table 3. Each of the interlayer films was interposed between two glass sheets each having a thickness of 3 mm, and the glass sheets were bonded at a temperature of 120° C. and 10 kg/cm² to afford laminated safety glass structures.

For comparison, laminated safety glass sheets were obtained in the same way as above except that 0.3 part by weight of a 40% by eight butyl cellosolve solution of magnesium octanoate was incorporated without the modified siloxane.

The penetration resistances of the laminated glass structures were measured, and the results are shown in Table 3.

Table 3

| Moisture content (%) | Ball falling height (feet) | |
|---|---|---|
| | Modified siloxane B and magnesium octanoate | Magnesium octanoate |
| 0.10 | 22 | 8 |
| 0.20 | 20 | 10 |
| 0.30 | 21 | 13 |
| 0.35 | 20 | 15 |
| 0.40 | 21 | 17 |
| 0.45 | 22 | 19 |
| 0.50 | 20 | 20 |
| 0.80 | 22 | 22 |

EXAMPLES 4 to 7

The procedure of Example 3 was repeated except that instead of 0.03 part by weight of the modified siloxane B, 0.03 part by weight of modified siloxane A (Example 4), 0.05 part by weight of modified siloxane C (Example 5), 0.05 part by weight of modified siloxane E (Example 6), and 0.05 part by weight of modified siloxane F (Example 7) were used respectively. The penetration resistances of thee laminated safety glass structures are shown in Table 4.

Table 4

| Moisture content of the interlayer (%) | Ball falling height (feet) | | | |
|---|---|---|---|---|
| | Example 4 | Example 5 | Example 6 | Example 7 |
| 0.10 | 16 | 15 | 18 | 21 |
| 0.20 | 17 | 17 | 19 | 20 |
| 0.30 | 18 | 16 | 19 | 20 |
| 0.35 | 19 | — | — | 20 |
| 0.40 | 19 | 18 | 21 | 21 |
| 0.50 | 18 | 18 | 20 | 20 |
| 0.60 | 19 | 17 | 19 | 20 |

Table 4-continued

| Moisture content of the interlayer (%) | Ball falling height (feet) | | | |
|---|---|---|---|---|
| | Example 4 | Example 5 | Example 6 | Example 7 |
| 0.80 | 18 | — | — | 21 |

Examples 8 to 10

Laminated glass structures ere prepared in the same way as in Example 3 exccept that the same amount of modified siloxane A was used instead of the modified siloxane B, and instead of a 40% by eight butyl cellosolve solution of magnesium octanoate, 0.01 part by weight of magnesium adipate (Example 8), 0.05 part of potassium propionate (Example 9), and 0.1 part by weight of magnesium 2-methyl-norbornane-2-carboxylate (Example 10) were used respectively. The results are shown in Table 5.

Table 5

| Moisture content of the interlayer (%) | Ball falling height (feet) | | |
|---|---|---|---|
| | Example 8 | Example 9 | Example 10 |
| 0.10 | 17 | 18 | 14 |
| 0.20 | 18 | 17 | 15 |
| 0.30 | 19 | 17 | 16 |
| 0.35 | 19 | — | — |
| 0.40 | 20 | 18 | 16 |
| 0.50 | 21 | 20 | 17 |
| 0.60 | 20 | 19 | 17 |

EXAMPLE 11

Laminated safety glass structures were prepared in the same way as in Example 3 except that 0.03 part by weight of modified siloxane D was used instead of 0.03 part by weight of the modified siloxane B, and 0.1 part of magnesium acetate was used instead of 0.1 part by weight of a butyl cellosolve solution of magnesium octanoate. The penetration resistances of the resulting safety glass structures were measured, and the results are shown in Table 6.

Table 6

| Moisture content (%) | Ball falling height (feet) |
|---|---|
| 0.10 | 15 |
| 0.20 | 16 |
| 0.30 | 16 |
| 0.40 | 17 |
| 0.50 | 18 |
| 0.60 | 18 |

EXAMPLES 12 and 13

The procedure of Example 3 as repeated except that 0.05 part by weight of modified siloxane E (Example 12) and 0.05 part by weight of modified siloxane G (Example 13) were used respectively instead of 0.03 part by weight of modified siloxane B, and 0.1 part by weight of magnesium 2-methylnorbornane-2-carboxylate was used instead of 0.1 part by weight of the butyl cellosolve solution of magnesium octanoate. The penetration resistances of the resulting laminate glass structures were measured, and the results are shown in

Table 7

| Moisture content of the interlayer (%) | Ball falling height (feet) | |
|---|---|---|
| | Example 12 | Example 13 |
| 0.10 | 17 | 17 |
| 0.20 | 18 | 17 |
| 0.30 | 20 | 16 |
| 0.40 | 21 | 19 |
| 0.50 | 20 | 18 |
| 0.60 | 20 | 20 |

EXAMPLE 14

The procedure of Example 3 was repeated except that 0.03 part by weight of modified siloxane H was used instead of 0.03 part by weight of modified siloxane B, and 0.1 part by weight of calcium acetate was used instead of 0.1 part of the butyl cellosolve solution of magnesium octanoate. The penetration resistances of the resulting laminate glass structures were determined, and the results are shown in Table 8.

Table 8

| Moisture content of the interlayer (%) | Ball falling height (feet) |
|---|---|
| 0.10 | 17 |
| 0.20 | 16 |
| 0.30 | 17 |
| 0.40 | 18 |
| 0.50 | 20 |
| 0.60 | 20 |

What is claimed is:

1. A laminated glass structure comprising at least two glass sheets bonded to each other through an interlayer of a plasticized polyvinyl acetal resin having a degree of acetalization of 55 to 80 mole %, said polyvinyl acetal resin being treated with a member selected from the group consisting of
   a. a modified liquid siloxanes containing 1 to 30 recurring units of each of the formulae

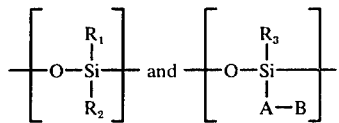

wherein $R_1$, $R_2$ and $R_3$, independently from each other, represent a monovalent hydrocarbon group; A represents an alkylene group containing not more than 20 carbon atoms which is optionally substituted with a hydroxyl group, or an oxyalkylene group containing not more than 250 carbon atoms which is optionally substituted with a hydroxyl group; and B represents

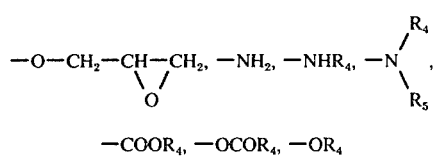

or -OH, in which $R_4$ and $R_5$, independently from each other, represent an alkyl group, with the proviso that when B is -OH, A represents the oxyalkylene group, wherein said modified siloxane is used in a proportion of 0.005 to 0.5 part by weight per 100 parts by weight of polyvinyl acetal resin and b. a combination of said modified siloxane with at least one alkali metal or alkaline earth metal salt of an organic mono- or dicarboxylic acid.

2. The laminated glass structure of claim 1 wherein $R_1$, $R_2$ and $R_3$, independently from each other, represent an alkyl group containing 1 to 5 carbon atoms or a phenyl group; A represents an alkylene group containing 2 to 5 carbon atoms which is optionally substituted by a hydroxyl group, or an oxyalkylene group containing 6 to 100 carbon atoms which is optionally substituted by a hydroxyl group; B represents

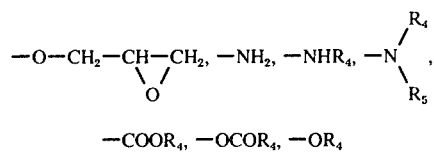

or -OH in which $R_4$ and $R_5$, independently from each other, represent an alkyl group containing 1 to 5 carbon atoms, and when B is —OH, A represents the oxyalkylene group.

3. The laminated glass structure of claim 2 wherein said modified siloxane is an epoxy-modified siloxane having 15 recurring units of each of the formulae

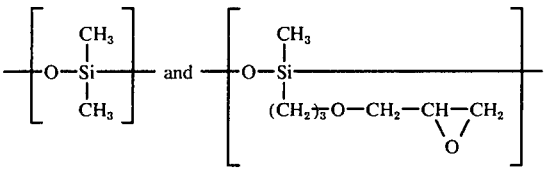

and containing a trimethylsilyl group at both ends of the siloxane.

4. The laminated glass structure of claim 2 wherein said modified siloxane is an ether-modified siloxane having 15 recurring units of each of the formulae

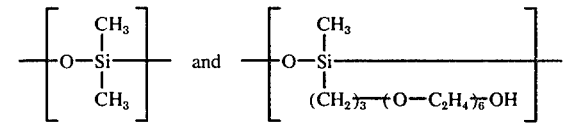

and containing a trimethylsilyl group at both ends of the siloxane.

5. The laminated glass structure of claim 2 wherein said modified siloxane is an ester-modified siloxane having 15 recurring units of each of the formulae

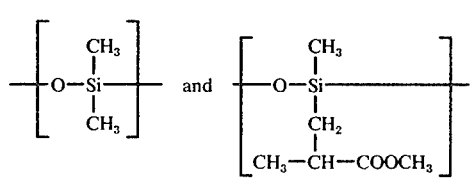

and containing a trimethylsilyl group at both ends of the siloxane.

6. The laminated glass structure of claim 1 wherein said aliphatic monocarboxylic acid contains 1 to 12 carbon atoms.

7. The laminated glass structure of claim 1 wherein said alkali metal is potassium.

8. The laminated glass structure of claim 1 wherein said alkaline earth metal is magnesium or calcium.

9. The laminated glass structure of claim 1 wherein said polyvinyl acetal resin is a polyvinyl butyral resin.

10. The laminated glass structure of claim 1 wherein said plasticized polyvinyl acetal resin contains 20 to 60 parts by weight of a plasticizer per 100 parts by weight of the polyvinyl acetal resin.

11. The laminated glass structure of claim 1 wherein said modified siloxane is used in a proportion of 0.01 to 0.1 part by weight per 100 parts by weight of the polyvinyl acetal resin.

12. The laminated glass structure of claim 1 wherein said alkali metal or alkaline earth metal salt of the organic mono- or di-carboxylic acid is used in a proportion of 0.01 to 0.2 part by weight per 100 parts by weight of the polyvinyl acetal resin.

13. An interlayer for a laminated glass structure, comprising a plasticized polyvinyl acetal resin having a degree of acetalization of 55 to 80 mole %, containing or having adhered thereto a combination of (a) a modified liquid siloxane containing 1 to 30 recurring units of each of the formulae

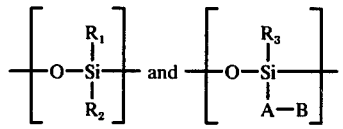

wherein $R_1$, $R_2$ and $R_3$, independently from each other, represent a monovalent hydrocarbon group; A represents an alkylene group containing not more than 20 carbon atoms which is optionally substituted with a hydroxyl group, or an oxyalkylene group containing not more than 250 carbon atoms, which is optionally substituted with a hydroxyl group; and B represents

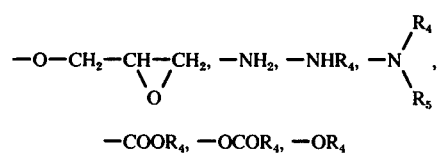

or —OH, in which $R_4$ and $R_5$, independently from each other, represent an alkyl group, with the proviso that when B is —OH, A represents the oxyalkylene group wherein said modified siloxane is used in a proportion of 0.005 to 0.5 part by weight per 100 parts by weight of polyvinyl acetal resin, and (b) at least one alkali metal or alkaline earth metal salt of an organic mono- or di-carboxylic acid wherein said organic monocarboxylic acid is an aliphatic monocarboxylic acid containing not more than 22 carbon atoms and said organic dicarboxylic acid is an aliphatic dicarboxylic acid containing 4 to 9 carbon atoms and said salt component is used in a proportion of 0.005 to 0.5 part by weight per 100 parts by weight of the polyvinyl acetal resin.

14. The interlayer of claim 13 wherein $R_1$, $R_2$ and $R_3$, independently from each other, represent an alkyl group containing 1 to 5 carbon atoms or a phenyl group; A represents an alkylene group containing 2 to 5 carbon atoms which is optionally substituted by a hydroxyl group, or an oxyalkylene group containing 6 to 100 carbon atoms which is optionally substituted by a hydroxyl group; B represents

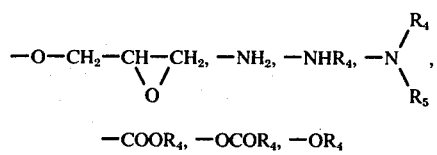

or —OH in which $R_4$ and $R_5$, independently from each other, represent an alkyl group containing 1 to 5 carbon atoms, and when B is —OH, A represents the oxyalkylene group.

15. The interlayer of claim 14 wherein said modified siloxane is an epoxy-modified siloxane having 15 recurring units of each of the formulae

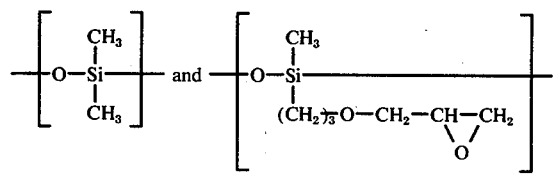

and containing a trimethylsilyl group at both ends of the siloxane.

16. The interlayer of claim 14 wherein said modified siloxane is an ether-modified siloxane having 15 recurring units of each of the formulae

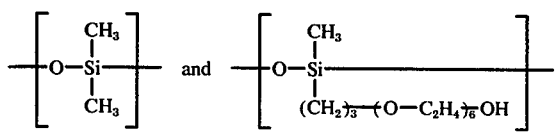

and containing a trimethylsilyl group at both ends of the siloxane.

17. The interlayer of claim 14 wherein said modified siloxane is an ester-modified siloxane having 15 recurring units of each of the formulae

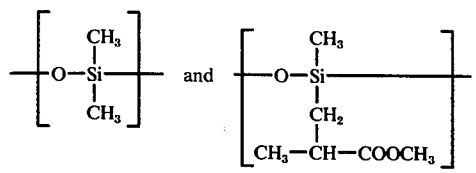

and containing a trimethylsilyl group at both ends of the siloxane.

18. The interlayer of claim 13 wherein said aliphatic monocarboxylic acid contains 1 to 12 carbon atoms.

19. The interlayer of claim 13 wherein said alkali metal is potassium.

20. The interlayer of claim 13 wherein said alkaline earth metal is magnesium or calcium.

21. The interlayer of claim 13 wherein said polyvinyl acetal resin is a polyvinyl butyral resin.

22. The interlayer of claim 13 wherein said plasticized polyvinyl acetal resin contains 20 to 60 parts by weight of a plasticizer per 100 parts by weight of the polyvinyl acetal resin.

23. The interlayer of claim 13 wherein said modified siloxane is used in a proportion of 0.01 to 0.1 part by weight per 100 parts by weight of the polyvinyl acetal resin.

24. The interlayer of claim 13 wherein said alkali metal or alkaline earth metal salt of the organic mono- or di-carboxylic acid is used in a proportion of 0.01 to 0.2 part by weight per 100 parts by weight of the polyvinyl acetal resin.

25. A process for preparing a laminated glass structure, which comprises interposing between at least two glass sheets an interlayer of a plasticized polyvinyl acetal resin having a degree of acetalization of 55 to 80 mole %, said resin being treated with a member selected from the group consisting of
   a. a modified liquid siloxane containing 1 to 30 recurring units of each of the formulae

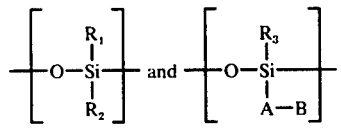

wherein $R_1$, $R_2$ and $R_3$, independently from each other, represent a monovalent hydrocarbon group; A represents an alkylene group containing not more than 20 carbon atoms, which is optionally substituted with a hydroxyl group, or an oxyalkylene group containing not more than 250 carbon atoms which is optionally substituted with a hydroxyl group; and B represents

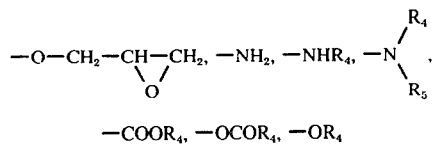

$-COOR_4$, $-OCOR_4$, $-OR_4$ or $-OH$, in which $R_4$ and $R_5$, independently from each other, represent an alkyl group, with the proviso that when B is $-OH$, A represents the oxyalkylene group, wherein said modified siloxane is used in a proportion of 0.005 to 0.5 part by weight per 100 parts by weight of polyvinyl acetal resin and
   b. a combination of said modified siloxane with at least one alkali metal or alkaline earth metal salt of a organic mono- or dicarboxylic acid wherein said organic monocarboxylic acid is an aliphatic monocarboxylic acid containing not more than 22 carbon atoms and said organic dicarboxylic acid is an aliphatic dicarboxylic acid containing 4 to 9 carbon atoms and said salt component is used in a proportion of 0.005 to 0.5 part by weight per 100 parts by weight of the polyvinyl acetal resin, and maintaining the resultant assembly at a temperature of 80° to 160° C. and a pressure of 5 to 10 kg/cm² for 10 to 60 minutes.

* * * * *